United States Patent
Kunhi Raman et al.

(10) Patent No.: US 12,537,916 B2
(45) Date of Patent: Jan. 27, 2026

(54) IOT-BASED NETWORK CAMERA AND MONITORING DEVICE

(71) Applicant: HANWHA VISION CO., LTD., Seongnam-si (KR)

(72) Inventors: Sujith Kunhi Raman, Seongnam-si (KR); Ju Young Jo, Seongnam-si (KR); Ji Hye Lee, Seongnam-si (KR); Dae Woo Choi, Seongnam-si (KR); Hyun Hee Lee, Seongnam-si (KR); Min Joong Kim, Seongnam-si (KR)

(73) Assignee: Hanwha Vision Co., Ltd., Seongnam-si (KR)

( * ) Notice: Subject to any disclaimer, the term of this patent is extended or adjusted under 35 U.S.C. 154(b) by 217 days.

(21) Appl. No.: 18/353,173

(22) Filed: Jul. 17, 2023

(65) Prior Publication Data
US 2024/0022692 A1    Jan. 18, 2024

Related U.S. Application Data

(63) Continuation of application No. PCT/KR2022/011348, filed on Aug. 2, 2022.

(30) Foreign Application Priority Data

Aug. 2, 2021 (KR) ........................ 10-2021-0101257

(51) Int. Cl.
*H04N 7/18*    (2006.01)
*G06F 16/735*    (2019.01)
(Continued)

(52) U.S. Cl.
CPC .......... *H04N 7/181* (2013.01); *G06F 16/735* (2019.01); *H04N 23/695* (2023.01); *G16Y 10/75* (2020.01)

(58) Field of Classification Search
CPC .. G06F 16/7328; G06F 16/735; G06F 16/783; G06F 16/7837; G06F 16/7867;
(Continued)

(56) References Cited

U.S. PATENT DOCUMENTS 10,776,441 B1 * 9/2020 Echeverria .............. H04L 67/75
2016/0294605 A1 * 10/2016 Searle ................... H04L 41/069
(Continued)

FOREIGN PATENT DOCUMENTS

| KR | 10160074686 A | 6/2016 |
| KR | 10-2008325 B1 | 5/2019 |
| KR | 20190057604 A | 5/2019 |

OTHER PUBLICATIONS

Qingyang Zhang, "Distributed Collaborative Execution on the Edges and Its Application to AMBER Alerts", IEEE Internet of Things Journal, vol. 14, No. 8, Aug. 2018.

*Primary Examiner* — Thai Q Tran
*Assistant Examiner* — Nienru Yang
(74) *Attorney, Agent, or Firm* — McLean IP Global; Jason Y. Pahng

(57) ABSTRACT

Provided is a network camera including a processor and a memory storing instructions executable by the processor, the processor executing the instructions to perform: an operation of capturing a video using an imaging device; an operation of publishing a topic related to the captured video to a message broker; an operation of receiving a search request message regarding the published topic from the message broker; an operation of searching the stored video according to the search request message; and an operation of generating a response message regarding the search request message based on the search result and sending the response message to the message broker.

20 Claims, 20 Drawing Sheets

(51) Int. Cl.
*G16Y 10/75* (2020.01)
*H04N 23/695* (2023.01)

(58) Field of Classification Search
CPC .... G06F 16/787; H04N 7/181; H04N 23/661;
H04N 23/695; H04N 23/90; H04N 7/18;
H04L 67/12; H04L 67/561; H04L 67/562;
G16Y 10/75
USPC ......................................................... 348/159
See application file for complete search history.

(56) References Cited

U.S. PATENT DOCUMENTS

2019/0208250 A1* 7/2019 Karp ................... H04L 67/1097
2020/0220931 A1* 7/2020 Dinh ..................... H04L 69/329
2020/0374205 A1* 11/2020 Sharma .................. H04L 67/10

* cited by examiner

```
VMS_ID/LicensePlateSearch
{
    "UtcTime": "2020-10-10T11:24:57.789Z",                  ─── 601
    "SearchParams": {
        "LicensePlateNumber": "09T3332",                    ─── 602
        "Geolocation": {
            "Latitude":23.00,
            "Longitude":33.00,                              ─── 603
            "Elevation":0.0,
        },
        "Radius": "2KM",                                    ─── 604
        "StartTime":"2020-10-10T10:24:57.789Z",             ─── 605
        "EndTime":"2020-10-10T11:24:57.789Z",               ─── 606
        "TimeoutDuration":"PT60S"                           ─── 607
    }
}
```

```
VMS_ID/LicensePlateSearch/resp_cameraid_1221
{
    "UtcTime": "2020-10-10T11:25:57.789Z",                    ─── 611
    "Results": [{
        "ResultIndex":1,                                      ─── 612
            "LicensePlateNumber": "09T3332",                  ─── 613
            "ResultImage": "base64encodedimage",              ─── 614
            "ImageType": "jpg",                               ─── 615
            "Geolocation": {
                "Latitude":23.00,
                    "Longitude":33,00,                        ─── 616
                    "Elevation":0.0,
            }
            "Time":"2020-10-10T11:20:57.789Z",                ─── 617
    },
    {
        "ResultIndex":2,                                      ─── 622
            "LicensePlateNumber": "09T3332",                  ─── 623
            "ResultImage": "base64encodedimage",              ─── 624
            "ImageType": "jpg",                               ─── 625
            "Geolocation": {
                "Latitude":23.00,
                    "Longitude":33,00,                        ─── 626
                    "Elevation":0.0,
            }
            "Time":"2020-10-10T11:22:57.789Z",                ─── 627
        }
    ]
}
```

```
VMS_ID/SearchFace
{
    "UtcTime": "2020-10-10T11:24:57.789Z",                    — 631
    "SearchParams": {
        "FaceImage": "base64encodedimage",                    — 632
        "ImageType": "jpg",                                   — 633
        "MinimumMatchThreshold":0.80,                         — 634
        "Geolocation": {
            "Latitude":23.00,
            "Longitude":33.00,                                — 635
            "Elevation":0.0,
        },
        "Radius": "2KM",                                      — 636
        "StartTime":"2020-10-10T10:25:57.789Z",               — 637
        "EndTime":"2020-10-10T11:25:57.789Z",                 — 638
        "TimeoutDuration":"PT60S"                             — 639
    }
}
```

```
VMS_ID/SearchFace/resp_cameraid_1221
{
    "UtcTime": "2020-10-10T11:25:57.789Z",     ─── 641
    "Results": [{
        "ResultIndex":1,                        ─── 642
        "ResultImage": "base64encodedimage",    ─── 643
        "ImageType": "jpg",                     ─── 644
        "Geolocation": {
            "Latitude":23.00,
            "Longitude":33,00,                  ─── 645
            "Elevation":0.0,
        },
        "Time":"2020-10-10T11:20:57.789Z",      ─── 656
    },
    {
        "ResultIndex":2,                        ─── 652
        "ResultImage": "base64encodedimage",    ─── 653
        "ImageType": "jpg",                     ─── 654
        "Geolocation": {
            "Latitude":23.00,
            "Longitude":33,00,                  ─── 655
            "Elevation":0.0,
        },
        "Time":"2020-10-10T11:21:57.789Z",      ─── 656
    }
    ]
}
```

```
VMS_ID/TargetSearch
{
    "UtcTime": "2020-10-10T11:24:57.789Z",                    — 661
    "SearchParams": {
        "TargetType": "Vehicle",                              — 662
        "TargetImage": "base64encodedimage",                  — 663
        "ImageType": "jpg",                                   — 664
        "Attributes": {
            "VehicleType":"Car",                              — 665
            "Manufacturer":"Hyundai",                         — 666
            "Model":"Sonata",                                 — 667
            "Color":"Black",                                  — 668
        },
        "Geolocation": {
            "Latitude":23.00,
            "Longitude":33,00,                                — 669
            "Elevation":0.0,
        },
        "Radius": "2KM",                                      — 670
        "StartTime":"2020-10-10T10:24:57.789Z",               — 671
        "EndTime":"2020-10-10T11:24:57.789Z",                 — 672
        "TimeoutDuration":"PT60S"                             — 673
    }
}
```

```
VMS_ID/TargetSearch/resp_cameraid_1221
{
    "UtcTime": "2020-10-10T11:25:57.789Z",                    ——— 681
    "Results": [{
        "ResultIndex":1,                                       ——— 682
            "TargetType": "Vehicle",                           ——— 683
            "LicensePlateNumber": "09T3332",                   ——— 684
            "ResultImage": "base64encodedimage",               ——— 685
            "ImageType": "jpg",                                ——— 686
            "Geolocation": {
                "Latitude":23.00,
                "Longitude":33,00,                             ——— 687
                "Elevation":0.0,
            },
            "Time":"2020-10-10T11:20:57.789Z",                 ——— 688
    },
    {
        "ResultIndex":2,                                       ——— 692
            "TargetType": "Vehicle",                           ——— 693
            "LicensePlateNumber": "09T3032",                   ——— 694
            "ResultImage": "base64encodedimage",               ——— 695
            "ImageType": "jpg",                                ——— 696
            "Geolocation": {
                "Latitude":23.00,
                "Longitude":33,00,                             ——— 697
                "Elevation":0.0,
            },
            "Time":"2020-10-10T11:22:57.789Z",                 ——— 698
        }
    ]
}
```

```
Camera_ID/TargetHandover
{
    "UtcTime": "2020-10-10T11:24:57.789Z",                  ───── 701
    "Handover": {
        "TargetType": "Vehicle",                            ───── 702
        "TargetImage": "base64encodedimage",                ───── 703
        "ImageType": "jpg",                                 ───── 704
        "Attributes": {
            "VehicleType":"Car",                            ───── 705
            "Manufacturer":"Hyundai",                       ───── 706
            "Model":"Sonata",                               ───── 707
            "Color":"Black",                                ───── 708
        },
        "Geolocation": {
            "Latitude":23.00,
            "Longitude":33.00,                              ───── 709
            "Elevation":0.0,
        },
        "Geoorientation": {
            "East":0.00,
            "North":0.00,                                   ───── 710
            "Up":3.0,
        }
    }
}
```

```
SrcCamera_ID/CommandHandover
{
    "UtcTime": "2020-10-10T11:24:57.789Z",         — 721
    "Handover": {
        "Command": "PTZPresetMove",                — 722
        "TargetCameraID": "CamID",                 — 723
        "PresetToken":"Token"                      — 724
    }
}
```

IOT-BASED NETWORK CAMERA AND MONITORING DEVICE

CROSS REFERENCE TO RELATED APPLICATION

This application is a continuation of international patent application number PCT/KR2022/011348, filed on Aug. 2, 2022, which is hereby incorporated by reference in its entirety. In addition, this application claims priority from Korean application number 10-2021-0101257, filed on Aug. 2, 2021, which is hereby incorporated by reference in its entirety for all purposes as if fully set forth herein.

BACKGROUND

Field

The present disclosure relates to an Internet of things (IoT)-based network camera and monitoring device.

Discussion of the Background

The Internet of things (IoT) is a technology that connects various communicable objects to the Internet. The communicable objects include various types of embedded devices such as smartphones, home appliances, wearable devices, and sensors. Recently, the IoT has been applied to various industrial fields and used for new services such as smart city, smart home, smart grid, and smart factory. Various communication protocols have been developed for the IoT, and the number of IoT devices is expected to increase exponentially in the near future. An Internet protocol (IP) address is needed to connect an IoT device to the Internet. However, with the existing IPv4 address system, it is difficult to assign addresses to IoT devices that have exponentially grown in numbers. Therefore, most IoT protocols use an IPv6 address system.

Message queuing telemetry transport (MQTT), a representative standard of the IoT technology, is a TCP/IP-based lightweight messaging protocol that can be used for IoT devices with limited functions such as sensors. MQTT exchanges topic-based messages on a publish/subscribe basis through a broker serving as a server.

However, conventional network cameras do not serve as MQTT clients and do not have a function of processing commands received from IoT sensors, and in general, direct communication is used for communication between the cameras. Therefore, IoT implementation in current CCTV cameras using MQTT has been very limited as a feature to generate events. In particular, application programs and usage scenarios related to event generation have not been defined for IP cameras.

Aspects of the present disclosure provide a new architecture in which a plurality of network cameras or a plurality of monitoring devices can efficiently execute surveillance camera applications such as event detection or target tracking through an Internet of things (IoT)-based message broker.

However, aspects of the present disclosure are not restricted to those set forth herein. The above and other aspects will become more apparent to one of ordinary skill in the art to which the disclosure pertains by referencing the detailed description of the present disclosure given below.

According to an aspect of the present disclosure, there is provided a network camera comprising a processor and a memory storing instructions executable by the processor, the processor executing the instructions to perform: an operation of capturing a video using an imaging device; an operation of publishing a topic related to the captured video to a message broker; an operation of receiving a search request message regarding the published topic from the message broker; an operation of searching the stored video according to the search request message; and an operation of generating a response message regarding the search request message based on the search result and sending the response message to the message broker, wherein the operation of publishing the topic to the message broker comprises registering an item that describes state information or event triggers related to the topic and an item that indicates the quality of content related to the topic through a graphic user interface (GUI).

The topic related to the captured video may include metadata about an event of the video.

The search request message may include at least a type of a target included in the video and further include at least one of a location of the target, a range based on the location, a search start time and a search end time, and a search timeout duration.

The processor may further perform: an operation of searching a video stored in a storage if both the search start time and the search end are earlier than a current time; an operation of searching a captured live video if both the search start time and the search end time are later than the current time; and an operation of searching both the video stored in the storage and the captured live video if the search start time is earlier than the current time and the search end time is later than the current time.

The type of the target may be a license plate, a vehicle, or a human face.

When the type of the target is a human face, the search request message further may include a match threshold with the human face.

Wherein when the type of the target is a vehicle, the search request message may further include at least one of a vehicle type, a vehicle manufacturer, a vehicle model, and a vehicle color.

The response message may include at least a search time and further include at least one of a result index, a target type, and a search location.

The processor may further perform an operation of receiving a handover message from the message broker, and the handover message includes a type of a target, a location of the target, and a direction of the target.

The processor may further perform an operation of receiving a handover message from the message broker, and The handover message includes camera motion control information, a camera identifier, and a preset token.

The processor may further perform an operation of controlling the direction of the imaging device according to the motion control information if the preset token is normal and the camera identifier is the same as that of the network camera.

The processor may further perform an operation of receiving a video captured by another network camera and publishing a topic related to the received video to the message broker.

According to another aspect of the present disclosure, there is provided a monitoring device comprising a processor and a memory storing instructions executable by the processor, the processor executing the instructions to perform: an operation of receiving a topic related to a captured video from a message broker; an operation of subscribing to the received topic; an operation of sending a search request message regarding the subscribed topic to the message broker; and an operation of receiving a response message regarding the search request message from the message broker, wherein the operation of sending the search request message to the message broker includes selecting at least one of received topics through a GUI and setting detailed filtering conditions for the selected topic, and the operation of receiving the response message from the message broker includes receiving, from the message broker, the response message comprising only results satisfying the detailed filtering conditions for the topic.

The processor may further perform: an operation of sending a topic filtering request for filtering a sub-condition of the subscribed topic to the message broker; and an operation of receiving, from the message broker, only response messages that satisfy the filtered sub-condition for the subscribed topic.

The processor may further perform an operation of sending a discovery request to the message broker to discover publishers currently connected to the message broker.

According to the present disclosure, it is possible to effectively secure a surveillance system in which a plurality of network cameras and a plurality of monitoring devices function as publishers and subscribers according to their functions and can easily publish a topic related to a video through a message broker without a communication agreement between them or can execute a flexible handover between them in order to subscribe to the published topic or track events.

BRIEF DESCRIPTION OF THE DRAWINGS

FIG. 8A is a coding illustrating a search request message for tracking a vehicle license plate, and FIG. 8B is a coding illustrating a response message corresponding to the search request message;

FIG. 9A is a coding illustrating a search request message for tracking a human face, and FIG. 9B is a coding illustrating a response message corresponding to the search request message;

FIG. 10A is a coding illustrating a search request message for tracking a vehicle, and FIG. 10B is a coding illustrating a response message corresponding to the search request message;

FIG. 11 is a coding illustrating a target handover message, and FIG. 12 is a coding illustrating a command handover message;

DETAILED DESCRIPTION

Figure 1:
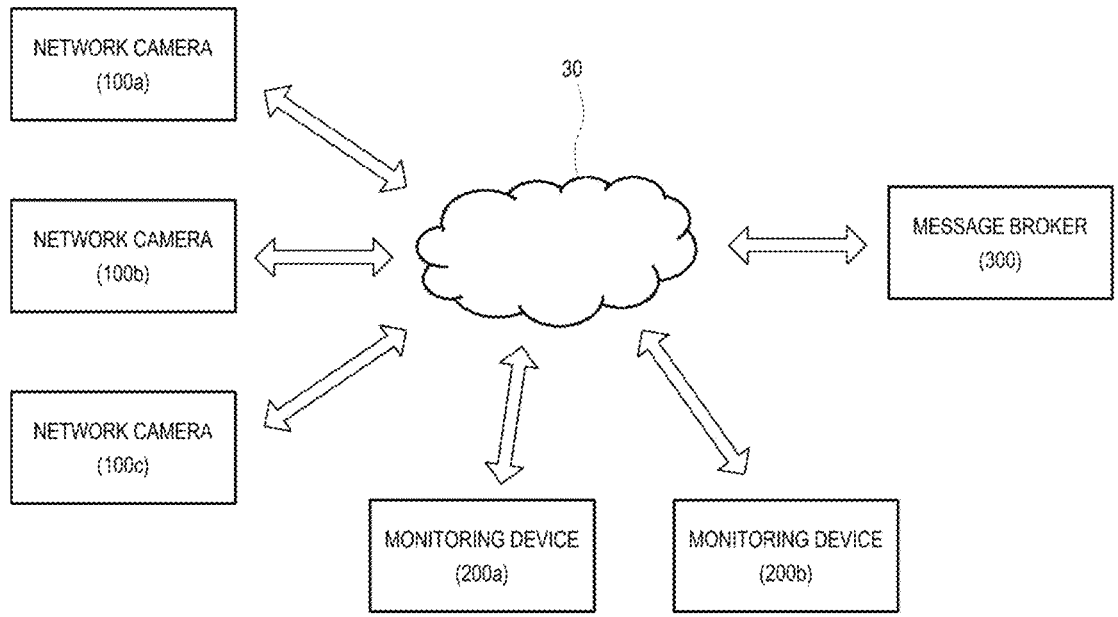
FIG. 1 is a block diagram illustrating client devices and a message broker connected on a network according to the present disclosure.

Advantages and features of the disclosure and methods to achieve them will become apparent from the examples described below with reference to the accompanying drawings. However, the inventive concept is not limited to examples disclosed herein but may be implemented in various ways. The examples are provided for making the disclosure of the inventive concept thorough and for fully conveying the scope of the inventive concept to those skilled in the art. It is to be noted that the scope of the disclosure is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the examples rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

Hereinafter, the present disclosure will be described in detail with reference to the accompanying drawings.

FIG. 1 is a block diagram illustrating client devices 100 and 200 and a message broker 300 connected on a network according to the present disclosure. The message broker 300 is communicatively connected to one or more client devices 100 and 200 through a network 30. The client devices 100 and 200 may include at least one network camera 100 (100*a*, 100*b*, 100*c*) having an imaging device and at least one monitoring device 200 (200*a*, 200*b*) reproducing a video received from the network camera 100. The network 30 may be a wired network such as a wide area network (WAN) or a local area network (LAN) or may be a wireless network such as a wireless LAN, a wireless personal area network (PAN), an ultra-wideband (UWB) or a cell network.

The network camera 100 is a device that can capture a video of a subject through an imaging device, and the monitoring device 200 is a device that can receive and reproduce/search the captured video or execute an action for a specific event. Examples of the monitoring device 200 include a mobile phone equipped with a web browser, a video playback terminal such as a PC or a TV, and a monitoring system such as a video management system (VMS). The network camera 100 or the monitoring device 200 may activate a message queuing telemetry transport (MQTT) function in the existing camera by additionally using an Open application or an Android application. For example, an Open application of an open development kit (SDK) or an Android application may be installed in an Android-based network camera so that each network camera can function as a publisher or a subscriber.

In addition, the message broker 300 may be an Internet of things (IoT)-based MQTT broker. MQTT is standardized as a lightweight message protocol for IoT that operates based on TCP/IP. The MQTT broker relays messages between a publisher and a subscriber, minimizes resource occupation, and has characteristics of low power, low bandwidth and low latency.

In FIG. 1, since the network camera 100 has an imaging device which may be a sensor, it can operate as both a publisher and a subscriber communicating with MQTT. In addition, the monitoring device 100 not having a sensor may operate as a subscriber.

Figure 2:
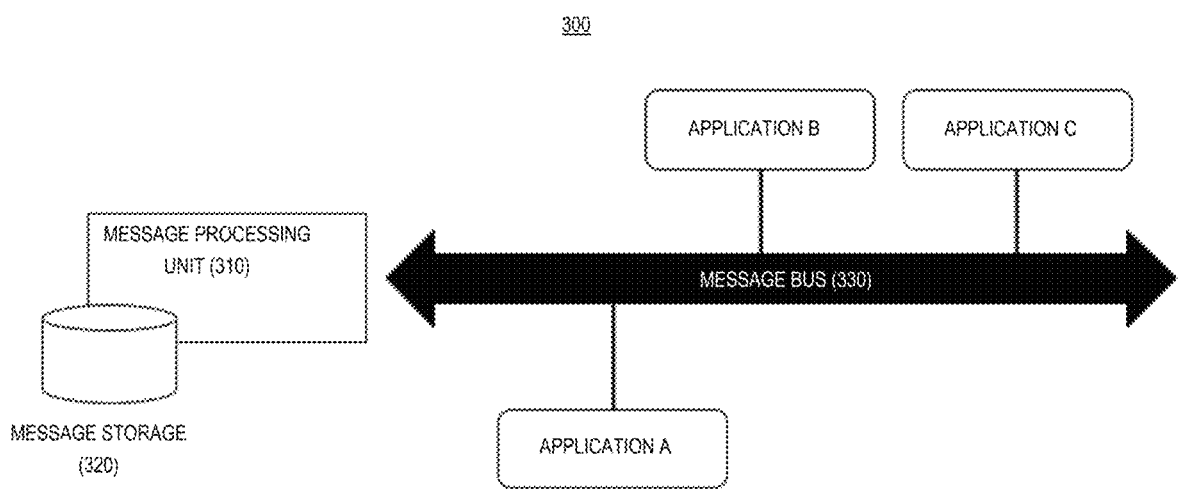
FIG. 2 is a block diagram illustrating a message broker or message queuing telemetry transport (MQTT) broker.

FIG. 2 is a block diagram illustrating a message broker or MQTT broker 300. Basically, the MQTT broker 300 is a message bus system. When a message processing unit 310 creates a message bus 330 and sends a message to it, applications coupled to the message bus 330 read the message. Messages of various topics may flow through the message bus 330, and a message channel having a topic as its name is created to distinguish the messages.

That is, applications installed in a publisher and a subscriber may connect to the message bus 330 of the message broker 300 and register topics of interest in order to subscribe to or publish messages. Since these topics can be hierarchically organized using slashes (/), a large number of sensor devices can be managed efficiently.

The publisher sends a message having a hierarchical structure called a topic to the message broker 300. The message broker creates a message bus together with the publisher and stores and manages topic information through the bus. The publisher publishes a topic to the message broker 300 when a certain event occurs or periodically.

The subscriber subscribes to a topic stored by the message broker 300 as described above. Since the subscriber can receive a plurality of related topics at once by utilizing a hierarchical structure of topics, it can effectively collect information from a plurality of IoT devices.

Figure 3:
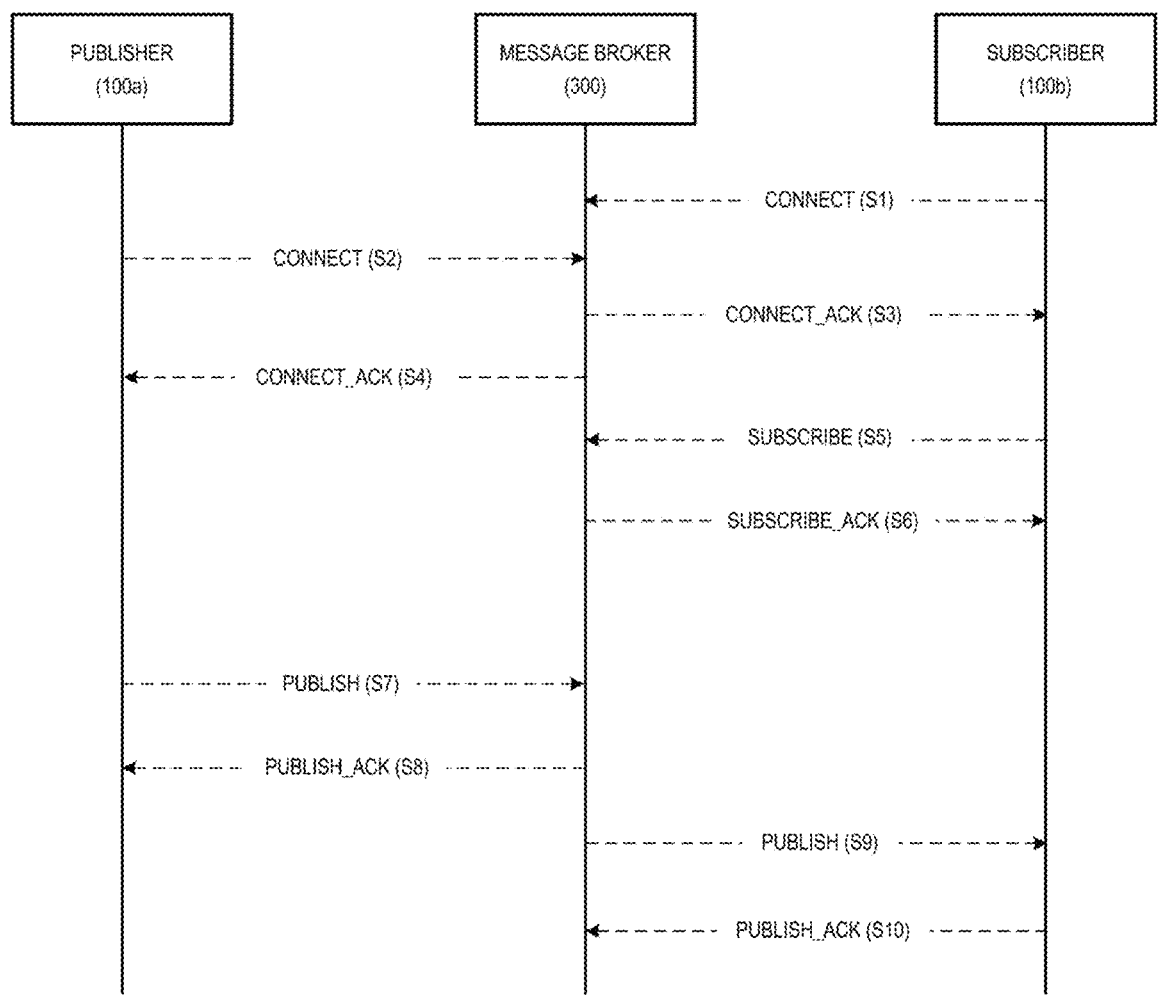
FIG. 3 is a diagram illustrating an operation process executed between a publisher and a subscriber through a message broker.

As described above, the publisher and the subscriber operate by sending and receiving topics through the message broker 300. FIG. 3 is a diagram illustrating an operation process executed between a publisher 100*a* and a subscriber 100*b* through a message broker 300.

First, when the publisher 100*a* and the subscriber 100*b* send a connection request to the message broker 300 (operations S1 and S2), the message broker 300 sends an acknowledgement (ACK) for the connection request to each of them (operations S3 and S4). Only after the publisher 100*a* and the subscriber 100*b* are registered as described above to be connected to the message broker 300, can the publisher 100*a* and the subscriber 100*b* exchange topics through the message broker 300.

Next, the subscriber 100*b* sends a subscription request for a desired topic through the message broker 300 (operation S5) and receives an ACK for the subscription request from the message broker 300 (operation S6).

Among a number of publishers, the publisher 100*a* capable of providing a result that matches the subscription request publishes a topic result to the message broker 300 (operation S7) and receives an ACK from the message broker 300 (operation S8). Accordingly, the message broker 300 relays the topic result to the subscriber 100*b* and receives an ACK from the subscriber 100*b* (operation S10). For example, when the subscriber 100*b* generates a subscription request for a result that can be detected by a specific sensor, the publisher 100*a* having the specific sensor may provide the detected result to the subscriber 100*b*.

Figure 4:
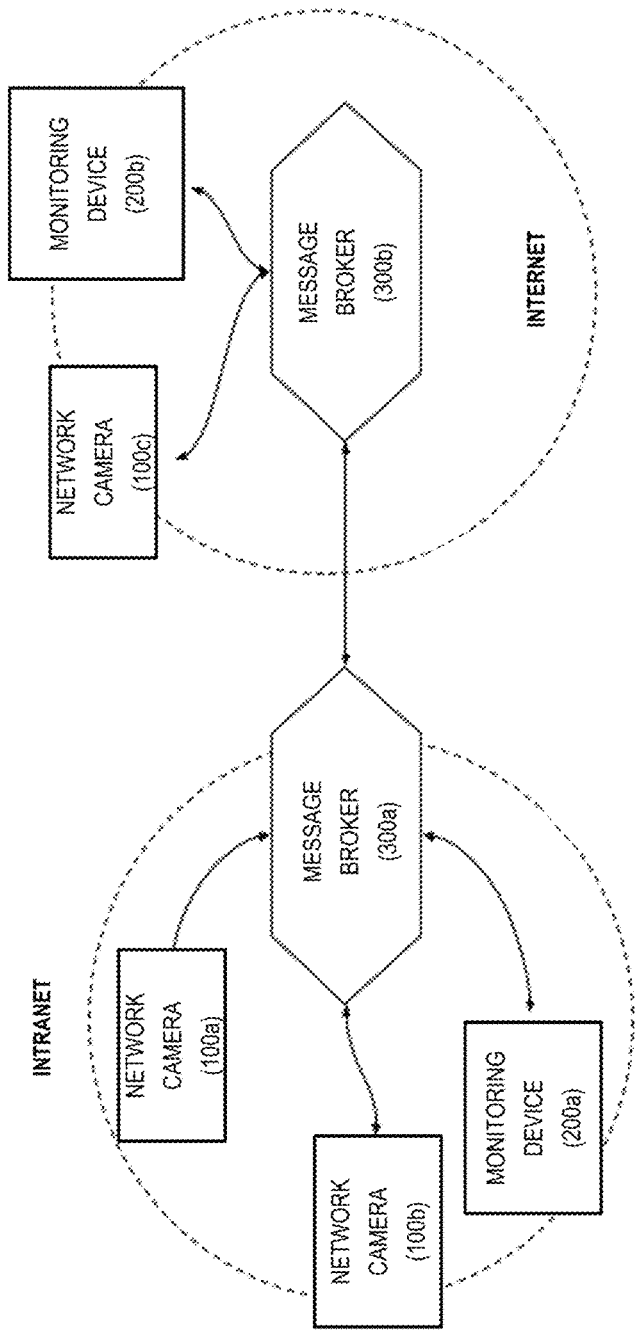
FIG. 4 is a diagram illustrating a plurality of message brokers located on an intranet and the Internet, respectively.

Meanwhile, MQTT supports a total of three levels of quality of service (QoS) in order to ensure message reliability according to service types, thus enabling message management according to service characteristics. Referring to FIG. 4, among a plurality of message brokers 300*a* and 300*b* capable of communicating with each other, a first message broker 300*a* is located in an intranet which is a private network, and a second message broker 300*b* is located on the Internet which is a public network.

Here, the first message broker 300*a* may perform relatively high QoS communication (e.g., QoS1, QoS2) with client devices 100*a*, 100*b* and 200*a* located in the intranet. On the other hand, the second message broker 300*b* may perform relatively low QoS communication (e.g., QoS0) with client devices 100*c* and 200*b* located on the Internet.

At the QoS0, a connection is terminated immediately after a subscriber sends a message once. It has the fastest transmission speed, but there is a possibility of message loss because it cannot be confirmed whether the message has been successfully transmitted to an MQTT broker.

At the QoS 1 level, a connection is terminated after a subscriber sends a message and then receives an ACK from the message broker 300 indicating that the message has been received. Since the message is continuously sent until an ACK is received from the message broker 300, the possibility of message loss is low, but there is a possibility of message duplication.

At the QoS 2 level, like the QoS 1 level, a subscriber sends a message and receives an ACK from the message broker 300 indicating that the message has been received. Then, the subscriber terminates the connection after additionally receiving an ACK for connection termination from the message broker 300. Therefore, the message duplication problem can be solved, but the transmission speed is the slowest because additional message exchange is required.

Figure 5:
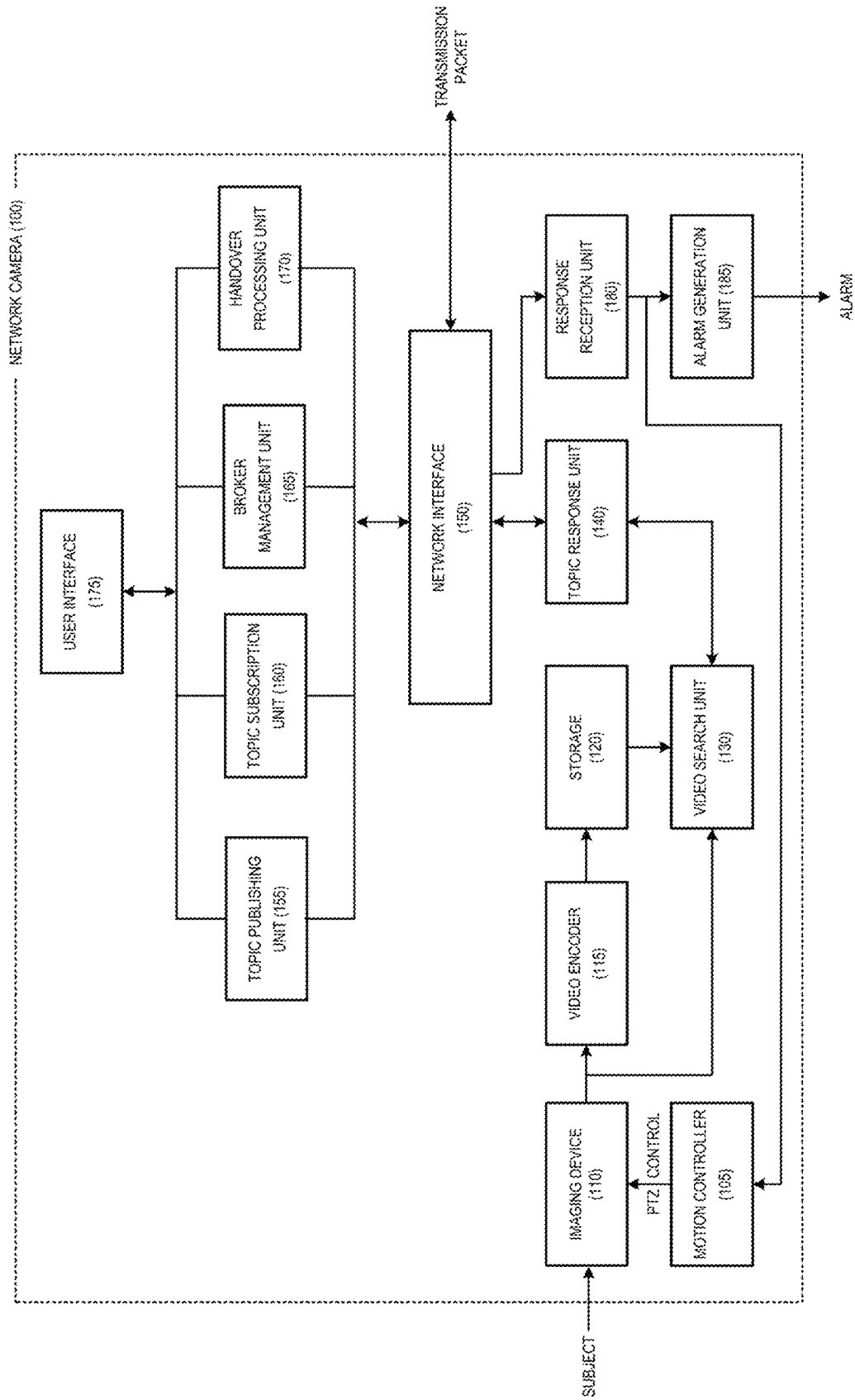
FIG. 5 is a detailed block diagram illustrating a network camera according to the present disclosure.

FIG. 5 is a detailed block diagram illustrating a network camera 100 according to the present disclosure. The network camera 100 may have only a publisher function, only a subscriber function, or both functions. In FIG. 5, the network camera 100 has both publisher and subscriber functions, but the present disclosure is not limited thereto.

The network camera 100, functioning as a publisher, may comprise an imaging device 110, a video encoder 115, a storage 120, a video search unit 130, a topic response unit 140, a network interface 150, a topic publishing unit 155, a broker management unit 165, a handover processing unit 170, and a user interface 175.

In addition, the network camera 100, functioning as a subscriber, may comprise a motion controller 105, the network interface 150, a topic subscription unit 160, and the broker management unit 165.

Figure 6:
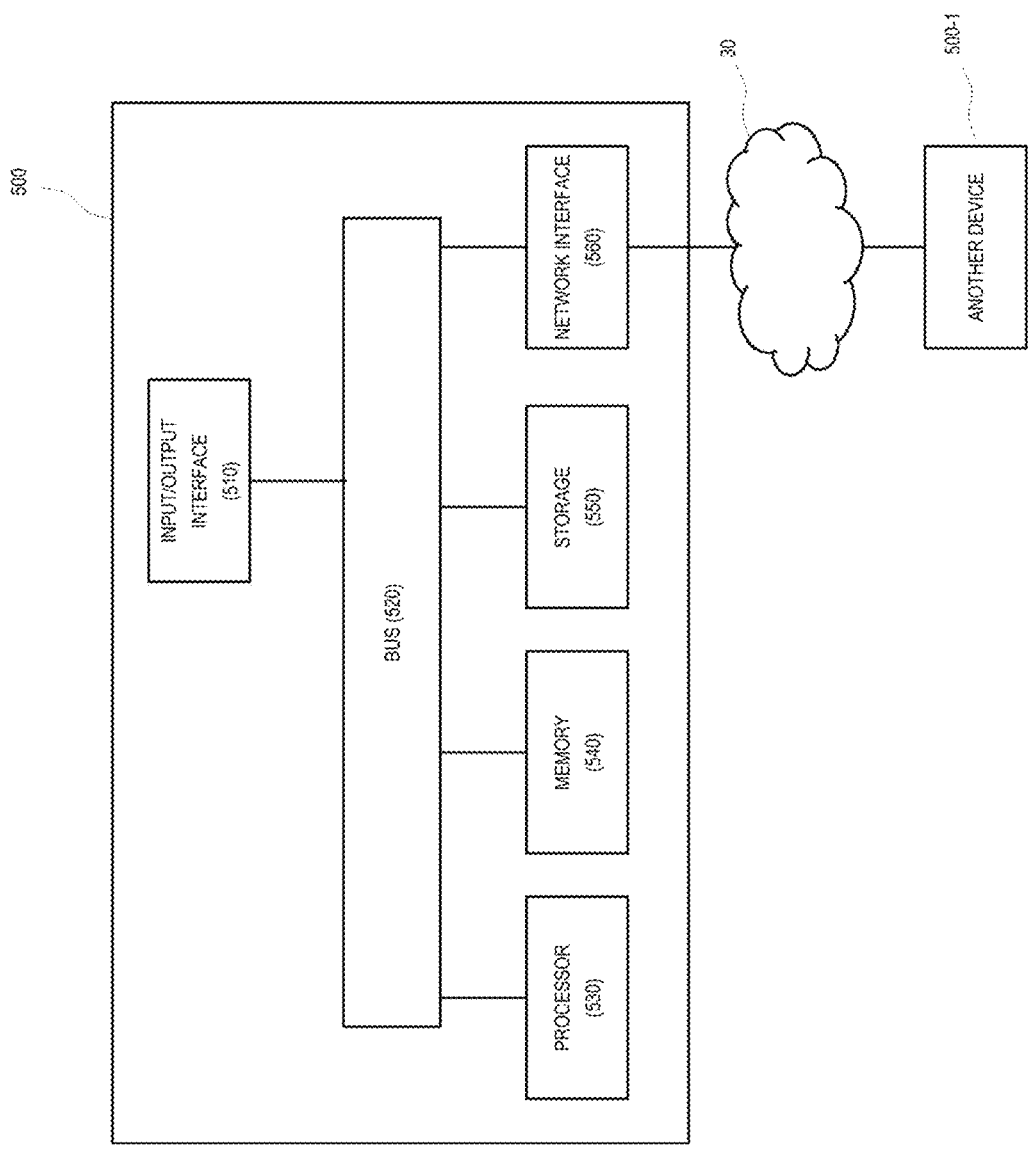
FIG. 6 is a block diagram illustrating the hardware configuration of a computing device that realizes a network camera.

Specifically, FIG. 6 is a block diagram illustrating the hardware configuration of a computing device 500 that realizes the network camera 100.

The computing device 500 has a bus 520, a processor 530, a memory 540, a storage 550, an input/output interface 510, and a network interface 560. The bus 520 is a data transmission path through which the processor 530, the memory 540, the storage 550, the input/output interface 510, and the network interface 560 send and receive data to and from each other. However, a method of connecting the processor 530 and the like to each other is not limited to the bus connection. The processor 530 is an operation processing device such as a central processing unit (CPU) or a graphics processing unit (GPU). The memory 540 is a memory such as a random access memory (RAM) or a read only memory (ROM). The storage 550 is a storage device such as a hard disk, a solid-state drive (SSD), or a memory card. In addition, the storage 550 may be a memory such as a RAM or a ROM.

The input/output interface 510 is an interface for connecting the computing device 500 and an input/output device. For example, a keyboard or mouse is connected to the input/output interface 510.

The network interface 560 is an interface for sending and receiving transmission packets by communicatively connecting the computing device 500 to an external device. The network interface 560 may be a network interface for connection to a wired line or a network interface for connection to a wireless line. For example, the computing device 500 may be connected to another computing device 500-1 through a network 30.

The storage 550 stores a program module that implements each function of the computing device 500. The processor 530 executes each program module to implement each function corresponding to the program module. Here, when executing each module, the processor 530 may read each module onto the memory 540 and then execute the module.

However, the hardware configuration of the computing device 500 is not limited to the configuration illustrated in FIG. 6. For example, each program module may be stored in the memory 540. In this case, the computing device 500 does not need to include the storage 550.

As described above, the network camera 100 includes at least the processor 530 and the memory 540 storing instructions executable by the processor 530. In particular, the network camera 100 shown in FIG. 5 is operated by executing instructions including various functional blocks or steps included in the network camera 100 using the processor 530.

The operation of the functional blocks included in the network camera 100 will now be described in detail with reference to FIG. 5.

First, the user interface 175 may include a graphic user interface (GUI) that visually provides information to a user and a touch panel, touch pad, mouse, keypad, keyboard, etc. for receiving commands from the user. Therefore, the user can utilize the user interface 157 to designate whether to operate or not and select detailed options of the topic publishing unit 155, the topic subscription unit 160, the broker management unit 165, and the handover processing unit 170.

The broker management unit 165 stores communication information that enables communication with the message broker 300. This process may be performed by the publisher 100a or the subscriber 100b which connects to the message broker 300 in operations S1 through S4 as illustrated in FIG. 3.

The topic publishing unit 155 publishes a topic related to a captured video to the message broker 300 through the network interface 150. The topic may be shared between publishers and subscribers through the message bus 330 described above.

The topic response unit 140 receives a search request message regarding the published topic from the message broker 300. The video search unit 130 may search a video stored in the storage 120 or a live video provided by the imaging device 110 according to the search request message. This search may include an intelligent event search through video analytics (VA). Accordingly, metadata about an event of the video may be generated along with the video. Here, the response message may include at least the metadata and may further include at least a portion of the video.

Specifically, the search request message may include at least the type of a target included in the video and may further include at least one of a location of the target, a range based on the location, a search start time, a search end time, and a search timeout duration. In addition, the type of the target may be a license plate, a vehicle, a human face, or an animal.

When the type of the target is a human face, the search request message may further include a match threshold with the human face. In addition, when the type of the target is a vehicle, the search request message may further include at least one of a vehicle type, a vehicle manufacturer, a vehicle model, and a vehicle color.

A specific format of the search request message will be described in more detail later with reference to FIGS. 8A, 9A, and 10A.

Referring back to FIG. 5, the camera 110 captures a video of a subject. To this end, the camera 110 may include an imaging device such as a charge coupled device (CCD) or a metal-oxide semiconductor (CMOS). The captured video is encoded through the video encoder 115 and stored in the storage 120. The video encoder 115 may include a video codec that follows a known video standard such as MPEG-4, H.264, or HEVC.

The video search unit 130 may selectively search a video stored in the storage 120 and/or a live video captured by the imaging device 110 depending on the search start time and search end time included in the search request message. Specifically, the video search unit 130 searches a video stored in the storage if both the search start time and the search end time are earlier than a current time. In addition, if both the search start time and the search end time are later than the current time, the video search unit 130 searches a captured live video. In addition, if the search start time is earlier than the current time and the search end time is later than the current time, the video search unit 130 may search both the video stored in the storage and the captured live video.

If a search result corresponding to the search request message exists among search results of the video search unit 130, the topic response unit 140 creates a response message including the search result and sends the response message to the message broker 300 through the network interface 150.

The response message may include at least a search time and may further include at least one of a result index, a target type, and a search location.

A specific format of the response message will be described in more detail later with reference to FIGS. 8B, 9B, and 10B.

Referring back to FIG. 5, the handover processing unit 170 may receive a handover message from the message broker 300 and execute a handover operation to seamlessly track a specific target. That is, the handover message refers to an operation of transferring a tracking function to another network camera when it is difficult for a network camera to track the specific target because the specific target has moved. Therefore, the handover message may be a type of response message transmitted by a publisher to a subscriber.

For seamless tracking, the handover message may include the type of a target, the location of the target, and the direction of the target. In addition, for seamless tracking, the handover message may include an additional command for controlling the pan-tilt-zoom (PTZ) direction of a subsequent network camera. Here, the handover message may further include camera motion control information, a camera identifier, and a preset token. If the preset token is normal and the camera identifier is the same as that of the network camera identifier, the authority to control the direction of the imaging device according to the motion control information may be authenticated.

A specific format of the handover message will be described in more detail later with reference to FIGS. 11 and 12.

When the network camera 100 functions as a subscriber, it may further include the topic subscription unit 160, a response reception unit 180, and an alarm generation unit 185.

The topic subscription unit 160 may subscribe to a topic (a topic related to surveillance video) published by another network camera and send a search request message regarding the topic to the message broker 300 through the network interface 150.

The response reception unit 180 receives a response message regarding the search request message from the message broker 300 and executes a corresponding operation according to the response message. The corresponding operation may include, for example, generating an alarm through the alarm generation unit 185 or performing a PTZ control of an imaging device through the motion controller 105. The alarm includes a warning sound, a warning image, a warning short message service (SMS), a warning e-mail, and the like. In addition, the PTZ control refers to controlling a monitoring direction of a camera module to an area of interest according to the response message.

Figure 7:
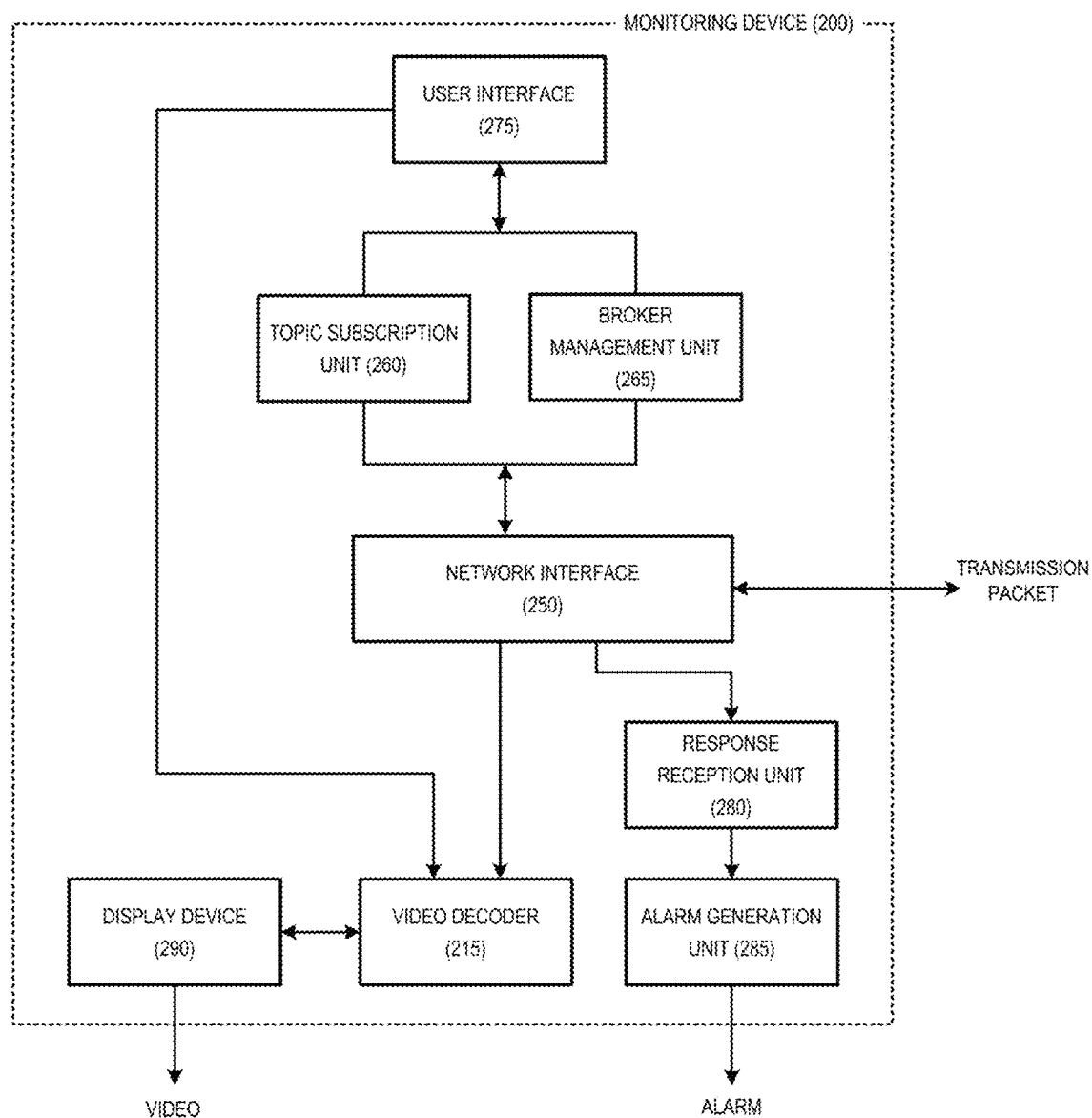
FIG. 7 is a block diagram illustrating a monitoring device according to the present disclosure.

FIG. 7 is a block diagram illustrating a monitoring device 200 according to the present disclosure. The monitoring device 200 may include a video decoder 215, a network interface 250, a topic subscription unit 260, a broker management unit 265, a user interface 275, a response reception unit 280, an alarm generation unit 285, and a display device 290. Like the network camera 100 described above, the monitoring device 200 may also be implemented as the computing device 500 shown in FIG. 6 and include a processor 530 and a memory 540 storing instructions executable by the processor 530. In particular, the monitoring device 200 shown in FIG. 7 is operated by executing instructions including various functional blocks or steps included in the monitoring device 200 using the processor 530.

Referring to FIG. 7, the user interface 275 may include a GUI that visually provides information to a user and a touch panel, touch pad, mouse, keypad, keyboard, etc. for receiving commands from the user. Therefore, the user can utilize the user interface 275 to designate whether to operate or not and select detailed options of the video decoder 215, the topic subscription unit 260, and the broker management unit 265.

The broker management unit 265 stores communication information that enables communication with the message broker 300. This process may be performed by the subscriber 100b which connects to the message broker 300 in operations S1 and S3 as illustrated in FIG. 3.

The topic subscription unit 260 may subscribe to a topic (a topic related to surveillance video) published by another network camera and send a search request message regarding the topic to the message broker 300 through the network interface 250.

The response reception unit 280 receives a response message regarding the search request message from the message broker 300 and executes a corresponding operation according to the response message. The corresponding operation may include, for example, generating an alarm through the alarm generation unit 285. The alarm includes a warning sound, a warning image, a warning SMS, a warning e-mail, and the like. The search request message and the response message may be implemented as in FIG. 5 described above.

The response reception unit 280 may also receive video data related to the response message via the message broker 300 or directly from the network camera 100. The received video data may be decoded by the video decoder 215 and provided to the display device 290, and the display device 290 may provide the decoded video on the screen to a user. The video decoder 215 may include, for example, a video codec that follows a known video standard such as MPEG-4, H.264, or HEVC.

Each component described above with reference to FIGS. 5 and 7 may be implemented as a software component, such as a task, a class, a subroutine, a process, an object, an execution thread or a program performed in a predetermined region of a memory, or a hardware component, such as a Field Programmable Gate Array (FPGA) or Application Specific Integrated Circuit (ASIC). In addition, the components may be composed of a combination of the software and hardware components. The components may be reside on a computer-readable storage medium or may be distributed over a plurality of computers.

In addition, each block may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

FIGS. 8A through 12 show coding in which the search request message, the response message, and the handover message described in FIGS. 5 and 7 are implemented in JavaScript Object Notation (JSON) code.

JSON is composed of a plurality of key-value pairs. JSON originated from the JavaScript language, but is now a data format widely used regardless of programming language. Therefore, with JSON, it is easy to exchange data between different systems and between different programming languages. When JSON is created as a file, the file extension is expressed as ".json", and the content-type for an HTTP request is "application/json".

FIG. 8A is a coding illustrating a search request message 600 for tracking a vehicle license plate, and FIG. 8B is a coding illustrating a response message 610 corresponding to the search request message 600.

Referring to FIG. 8A, the type of a search target in the search request message 600 is a license plate. Specifically, the search request message 600 includes a current time 601 expressed in coordinated universal time (UTC) format, a license plate number 602, the target's geographic location 603 including latitude/longitude/elevation, a search range (radius) 604 from the geographic location, a search start time 605 and a search end time 606 expressed in UTC format, and a search timeout duration 607. The search timeout duration 607 means that a search request is canceled when there is no response from a network camera receiving the search request within a predetermined time (e.g., 60 seconds).

In addition, referring to FIG. 8B, the type of a search target in the response message 610 corresponding to the search request message 600 is also a license plate. Specifically, the response message 600 may include a current time 611 expressed in UTC format and a plurality of search results. The search results are assigned search indices 612 and 622 according to the number of search results. A search result 612 with a search index of 1 includes a license plate number 613, an encoding code 614 of an image provided as a result, an image file type 615, the target's geographic location 616 including latitude/longitude/elevation, and a search time 617. Similarly, a search result 622 with a search index of 2 includes search results 623 through 627 in the same format.

FIG. 9A is a coding illustrating a search request message 630 for tracking a human face, and FIG. 9B is a coding illustrating a response message 640 corresponding to the search request message 630.

Referring to FIG. 9A, the type of a search target in the search request message 630 is a face image. Specifically, the search request message 630 includes a current time 631 expressed in UTC format, an encoding code 632 of an image, an image file type 633, a minimum match threshold 634, the target's geographic location 635 including latitude/longitude/elevation, a search range 636 from the geographic location, a search start time 637 and a search end time 638 expressed in UTC format, and a search timeout duration 639. The minimum match threshold 634 is a minimum value of similarity with the face image provided in the search request. For example, only a result having a similarity of 0.80 or higher may be requested as a response.

In addition, referring to FIG. 9B, the type of a search target in the response message 640 corresponding to the search request message 630 is also a face image. Specifically, the response message 640 may include a current time 641 expressed in UTC format and a plurality of search results. The search results are assigned search indices 642 and 652 according to the number of search results. A search result 642 with a search index of 1 includes an encoding code 643 of an image provided as a result, an image file type 644, the target's geographic location 645 including latitude/longitude/elevation, and a search time 656. Similarly, a search result 622 with a search index of 2 includes search results 653 through 656 in the same format.

FIG. 10A is a coding illustrating a search request message 660 for tracking a vehicle, and FIG. 10B is a coding illustrating a response message 680 corresponding to the search request message 660.

Referring to FIG. 10A, the type of a search target in the search request message 660 is a vehicle. Specifically, the search request message 660 includes a current time 661 expressed in UTC format, a target type 662, an encoding code 663 of an image, an image file type 664, vehicle attributes including a vehicle type 665, a manufacturer 666, a vehicle model 667 and a vehicle color 668, the target's geographic location 669 including latitude/longitude/elevation, a search range 670 from the geographic location, a search start time 671 and a search end time 672 expressed in UTC format, and a search timeout duration 673.

In addition, referring to FIG. 10B, the type of a search target in the response message 680 corresponding to the search request message 660 is also a vehicle. Specifically, the response message 680 may include a current time 681 expressed in UTC format and a plurality of search results. The search results are assigned search indices 682 and 692 according to the number of search results. A search result 682 with a search index of 1 includes a target type 683, a license plate number 684, an encoding code 685 of an image provided as a result, an image file type 686, the target's geographic location 687 including latitude/longitude/elevation, and a search time 688. Similarly, a search result 692 with a search index of 2 includes search results 693 through 698 in the same format.

FIG. 11 is a coding illustrating a target handover message 700. The target handover message 700 refers to an operation of transferring a tracking function to another network camera when it is difficult for a network camera to track a specific target because the specific target has moved. Therefore, the handover message 700 may be a type of response message transmitted by a publisher to a subscriber.

Specifically, the target handover message 700 includes a current time 701 expressed in UTC format, a type 702 of a target being tracked, an encoding code 703 of an image, an image file type 704, vehicle attributes including a vehicle type 705, a manufacturer 706, a vehicle model 707 and a vehicle color 708, the target's geographic location 709 including latitude/longitude/elevation, and a direction 710 in which the target being tracked moves. A network camera that receives the handover message 700 and performs (takes over) follow-up tracking can continue tracking the target without interruption by utilizing the geographic location 709 and the moving direction 710.

FIG. 12 is a coding illustrating a command handover message 720. The command handover message 720 is for the function of controlling, in real time, the motion of a subsequent network camera at the same time as the handover. Therefore, compared with the target handover message 700, the command handover message 720 must be performed by an authorized network camera. To this end, a device that sends the command handover message 720 includes a token including a hash value for authenticating the authority.

Specifically, the command handover message 720 includes a current time 721 expressed in UTC format, a PTZ preset move 722, a camera ID 723 of a network camera receiving the message, and a token 724 for authenticating authority. Referring to FIG. 5, the network camera 100 receiving a PTZ preset move from an authorized device automatically controls the direction of an imaging device through the motion controller 105 according to the PTZ preset move value.

The search request messages and the response messages described in FIGS. 8A through 12 above are written in JSON format. However, the present disclosure is not limited thereto, and the above messages may also be written in other structured formats such as XML path language (XPath). The XPath is a worldwide web consortium (W3C) standard and is a language that describes a way of arranging and processing items using a syntax specified on a path through a structure of an extension creation language document. It is simpler and more abbreviated than XML representation and is a language used for XSL transformation (XSLT) and XML pointer. The XPath uses path expressions to define nodes in an XML document and is known to have mathematical functions and other extensible expressions.

Figure 13:
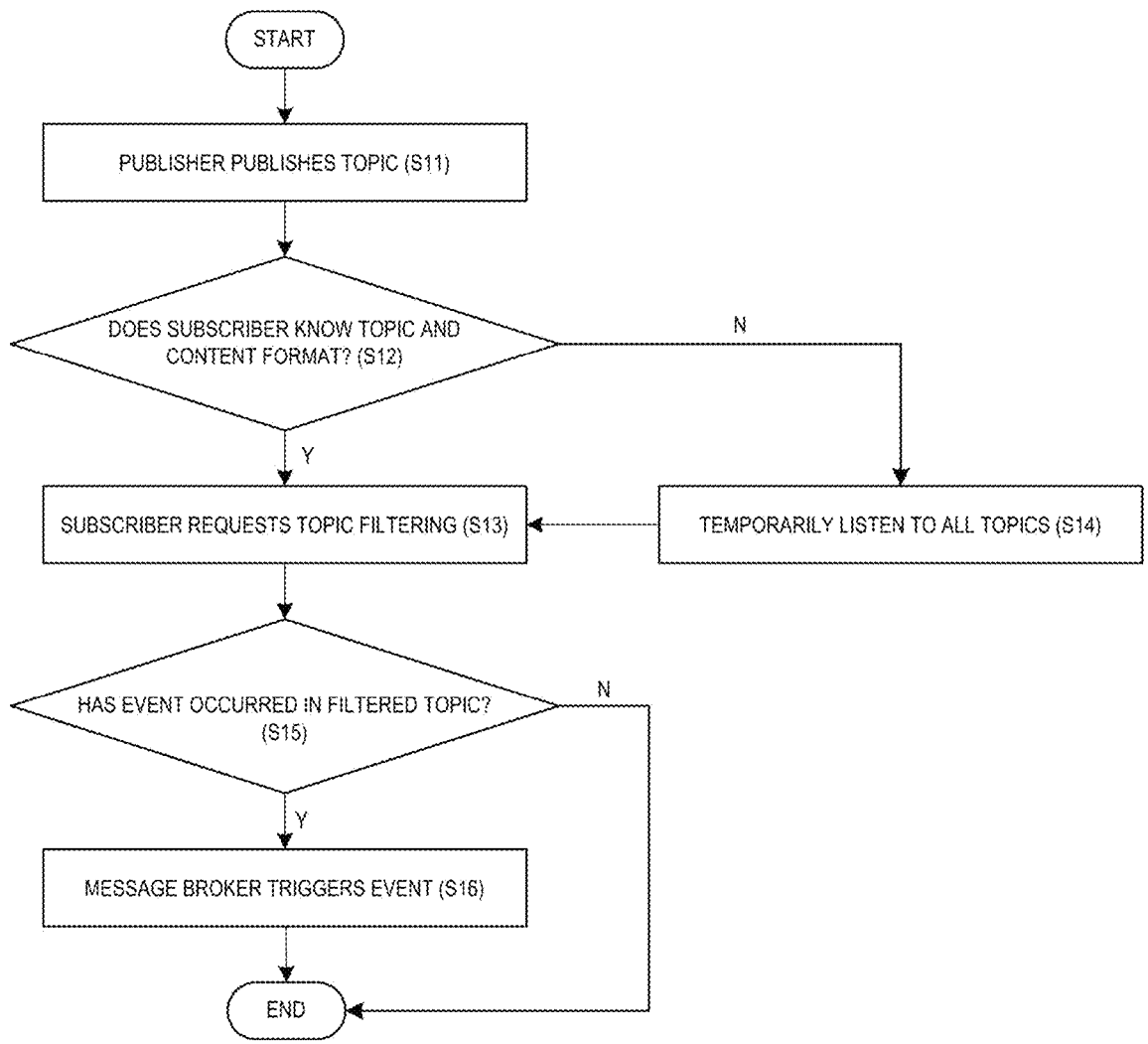
FIG. 13 is a flowchart illustrating a topic filtering process according to the present disclosure.

FIG. 13 is a flowchart illustrating a topic filtering process according to the present disclosure. A message broker may generally manage topics published by a plurality of publishers 100, and a subscriber 200 may subscribe to and receive desired topics among the published topics. Therefore, the message broker 300 provides each subscriber 200 with only subscribed topics among the published topics. Ultimately, in a general MQTT structure, each publisher 100 publishes topics based on functions or resources that it can provide, and a subscriber 200 subscribes to and receives some of the topics.

The present disclosure improves the above MQTT structure for use in surveillance camera applications and suggests a function that enables a subscriber 200 to additionally filter sub-conditions or content of the topics rather than simply selecting from among the published topics. That is, instead of subscribing to published topics as they are, the subscriber 200 filters the topics and subscribes only to topics that satisfy a desired sub-condition. This filtering process will be described in more detail with reference to FIG. 13.

First, a publisher 100 publishes a postable topic (operation S11). Here, if a subscriber 200 already knows the topic and a content format/path included in the topic (Yes in operation S12), the subscriber 200 sends a topic filtering request to a message broker 300 (operation S13). Since the topic filtering request is transmitted by the subscriber 200 to the message broker 300, it may be distinguished from a search request message transmitted by the message broker 300 to the publisher 100. Therefore, the publisher 100 only needs to provide an event occurrence result for the topic to the message broker 300 in response to the request of the message broker 300 without particularly changing an algorithm regarding topic filtering. The message broker 300 receives an event result for a specific topic, filters the event result by itself, and then provides the filtered result to the subscriber 200. Therefore, even if the message broker 300 receives an event trigger for a specific topic from the publisher 100, the event trigger is not sent to the subscriber 200 unless it satisfies a detailed condition of the topic requested by the subscriber 200 to be filtered.

For example, let us assume that the publisher 100 publishes a topic including a line cross event and that the subscriber 100 limits an object in the topic to "man" among people. Here, when a line cross event by "animal" or "woman" occurs, the publisher 100 sends an event trigger to the message broker 300. Even though an event occurred in the topic to which the subscriber 200 has subscribed, the message broker 300 does not send a response message including the event trigger to the subscriber 200 because the event trigger does not satisfy the filtering condition "man".

Referring back to FIG. 13, if the subscriber 200 does not already know the topic and the content format/path included in the topic (No in S12), all currently published topics are temporarily listened to (operation S14). In addition, the subscriber 200 sends a topic filtering request (operation S13) for the listened—to topics to the message broker 300 (operation S13).

When an event occurs in a filtered topic (operation Y in S15), the message broker 300 sends a response message indicating that the event has occurred to the subscriber 200 (operation S16).

Meanwhile, a variable structure in which a plurality of publishers are not fixed but some of the publishers are removed through ON/OFF or connect/disconnect, or a new publisher is added may be considered. The publishers in this variable structure are particularly needed in applications such as home assistants. That is, even if a first set of publishers 100 publish various topics to the message broker 300, a certain topic may be unavailable at the time when a subscriber 200 subscribes to the topic and sends a search message, or a new topic may be available.

Figure 14:
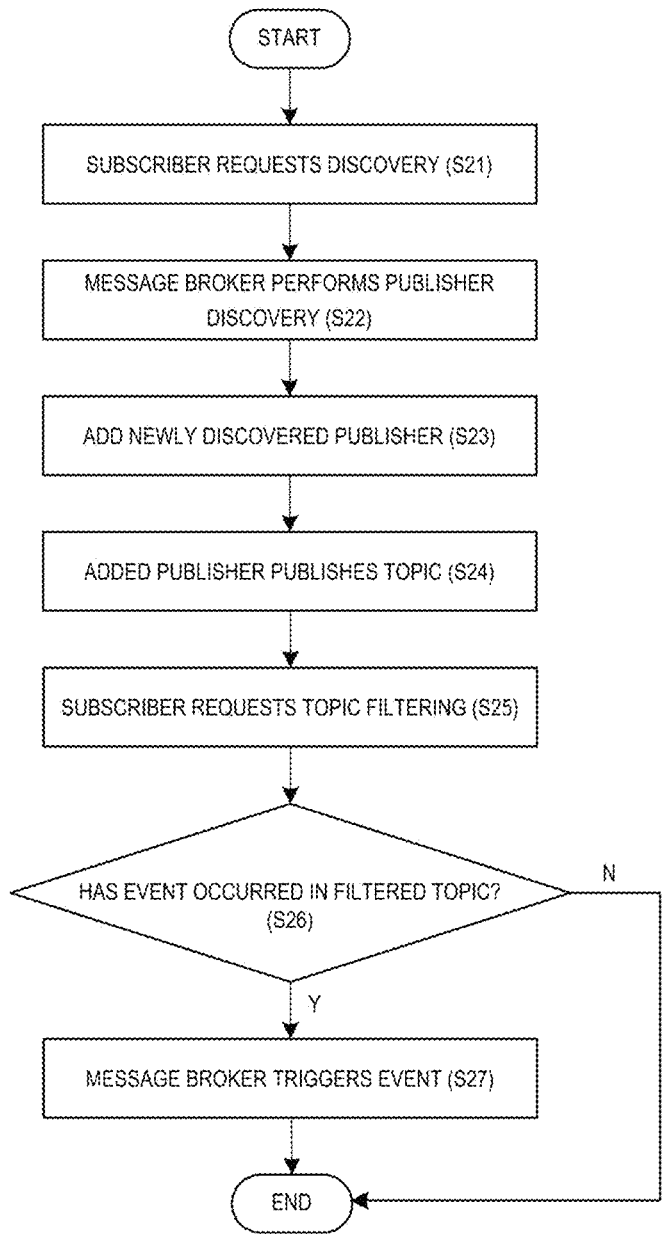
FIG. 14 is a flowchart illustrating a publisher discovery process according to the present disclosure.

Therefore, in the present disclosure, it is necessary to perform a discovery process periodically or according to a discovery request of a subscriber so that a subscriber can subscribe to and receive a search message after currently available publishers and topics published by the publishers are updated. In relation to this, FIG. 14 is a flowchart illustrating a publisher discovery process according to the present disclosure.

First, when receiving a discovery request from a subscriber 200 (operation S21), a message broker 300 performs a discovery process to discover currently connected publishers (operation S22). Alternatively, the message broker 300 may perform the discovery process periodically or non-periodically without a request.

Next, the message broker 300 adds a publisher newly discovered through the discovery process and deletes or retains a publisher that originally existed but has now disappeared (operation S23). Even if a publisher has disappeared, the publisher can access again at any moment. Therefore, the message broker 300 may temporarily store a publisher identifier and a topic without completely deleting them. Alternatively, the message broker 300 may leave the disappeared publisher and the topic as they are and provide them to a separate subscriber 200 displayed inactive.

Next, the newly added publisher publishes an available topic to the message broker 300 (operation S24). Accordingly, the message broker 300 updates the existing topic list by adding the published topic.

The subscriber makes a topic filtering request for the updated topic list (operation S25). When an event occurs in a filtered topic (Y in operation S26), the message broker 300 triggers an event to the subscriber 200 (operation S27).

A network camera 100 as a publisher and a monitoring device 200 as a subscriber may be individually connected to or disconnected from the centralized message broker 300. Here, each network camera 100 may be registered with the message broker 300 as an equal publisher but may also be indirectly connected to the message broker 300 through other network cameras 100 in a proxy or relay form.

Figure 15:
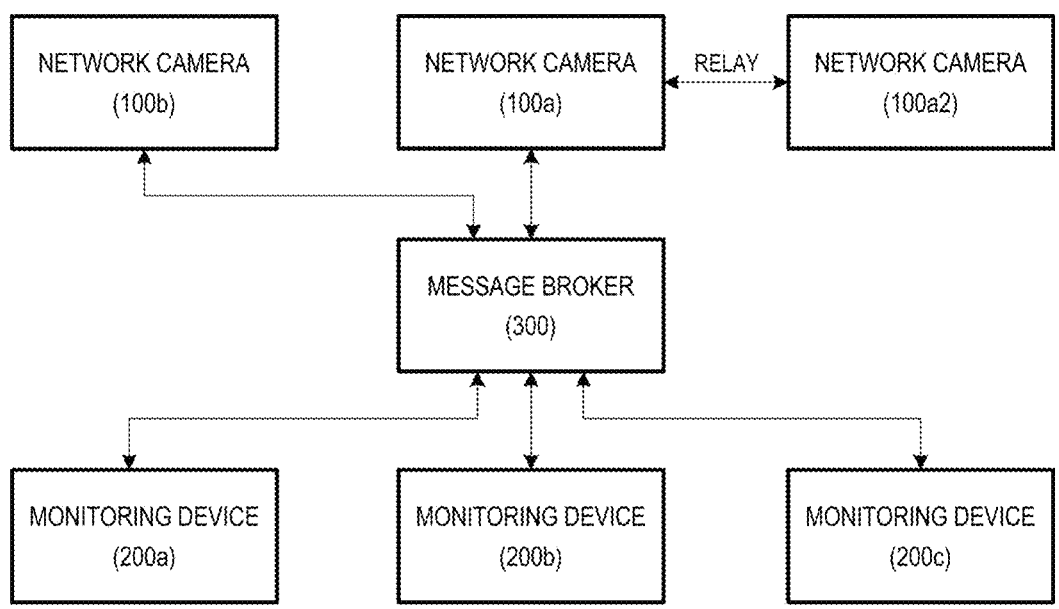
FIG. 15 is a block diagram illustrating a relay method according to the present disclosure.

In relation to this, FIG. 15 is a block diagram illustrating a relay method according to the present disclosure. Network cameras 100a and 100b are registered with a message broker 300 as normal publishers and a plurality of monitoring devices 200a, 200b and 200c are connectable to the message broker 300.

However, some network cameras may not have an MQTT function that enables them to operate as publishers in conjunction with the message broker 300. However, since such network cameras 100a2 can also have an important monitoring function, they need to be included in an MQTT system.

To this end, the present disclosure proposes a method in which a network camera 100a functioning as a publisher takes charge of (relays), as a proxy, topic publishing and event triggering functions for a network camera 100a2 without the MQTT function. The network camera 100a may provide functions and resources of the network camera 100a2 equivalently to its own when publishing a topic or triggering an event. For example, when the network camera 100a is in charge of channel 1 and the network camera 100a2 is in charge of channel 2, the network camera 100a may register both channels in the message broker 300 as if the channels were its own channels and then may execute topic publishing and event triggering. Accordingly, the monitoring devices 200a, 200b and 200c or the message broker 300 can fully use the monitoring function of the network camera 100a2 by using the proxy or relay function of the network camera 100a without the need to know the existence of the network camera 100a2. To this end, the network camera 100a2 only needs to provide state information to the network camera 100a serving as a proxy and, when an event occurs, send the result to the proxy at the request of the proxy.

For example, the network camera 100a functioning as a proxy may consider not only a video captured by itself but also a video captured by and received from another network camera 100a2 as equivalent to the video captured by itself. Accordingly, the network camera 100a can publish topics related to all videos including a plurality of videos generated from different sources to the message broker 300. When this proxy/relay function is utilized, a plurality of publishers that do not support the MQTT function are also virtually registered with the message broker 300 and thus can publish topics.

Figure 16A:
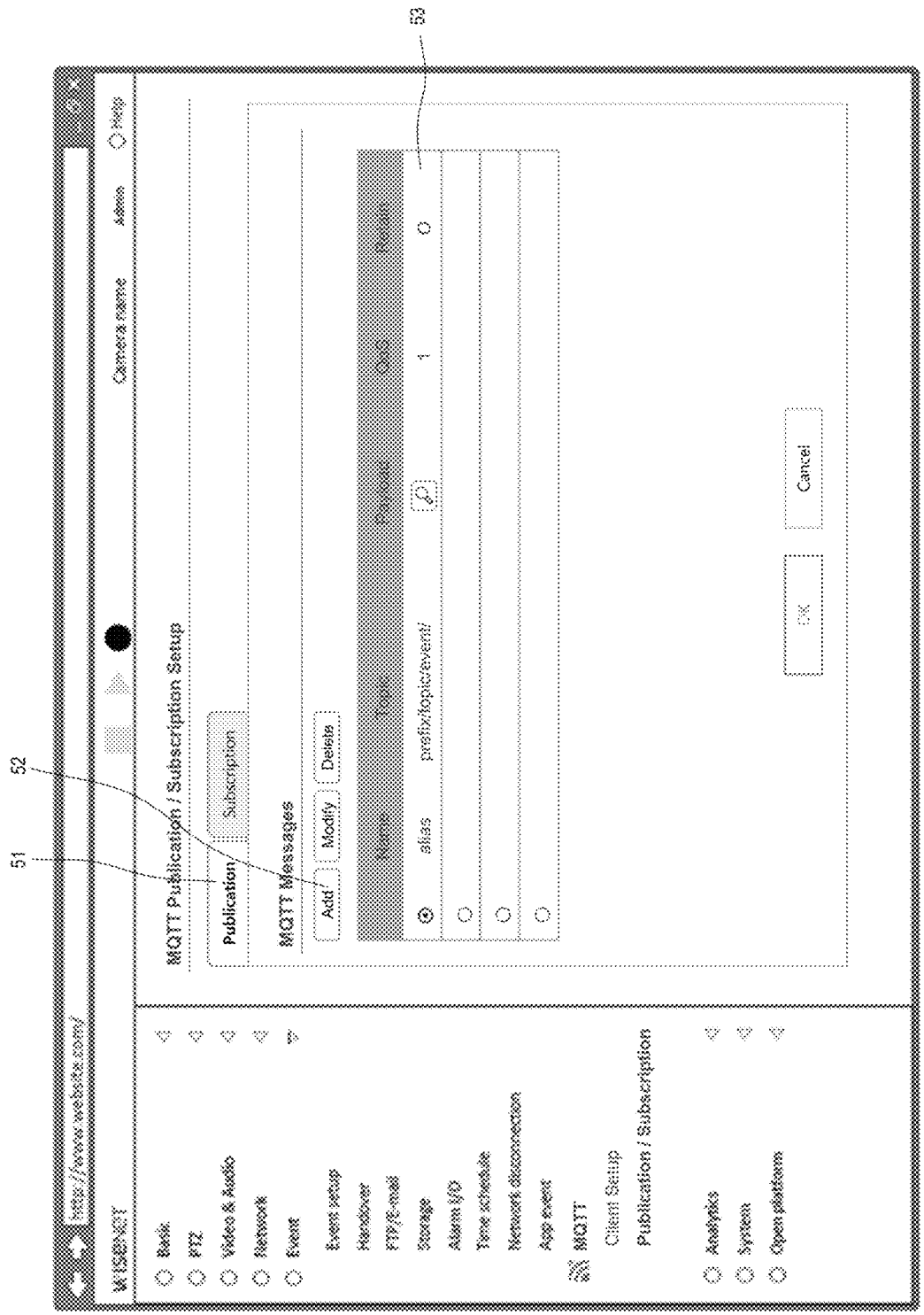
FIG. 16A is an illustration of a graphic user interface (GUI) used by a publisher to add a topic.
Figure 16B:
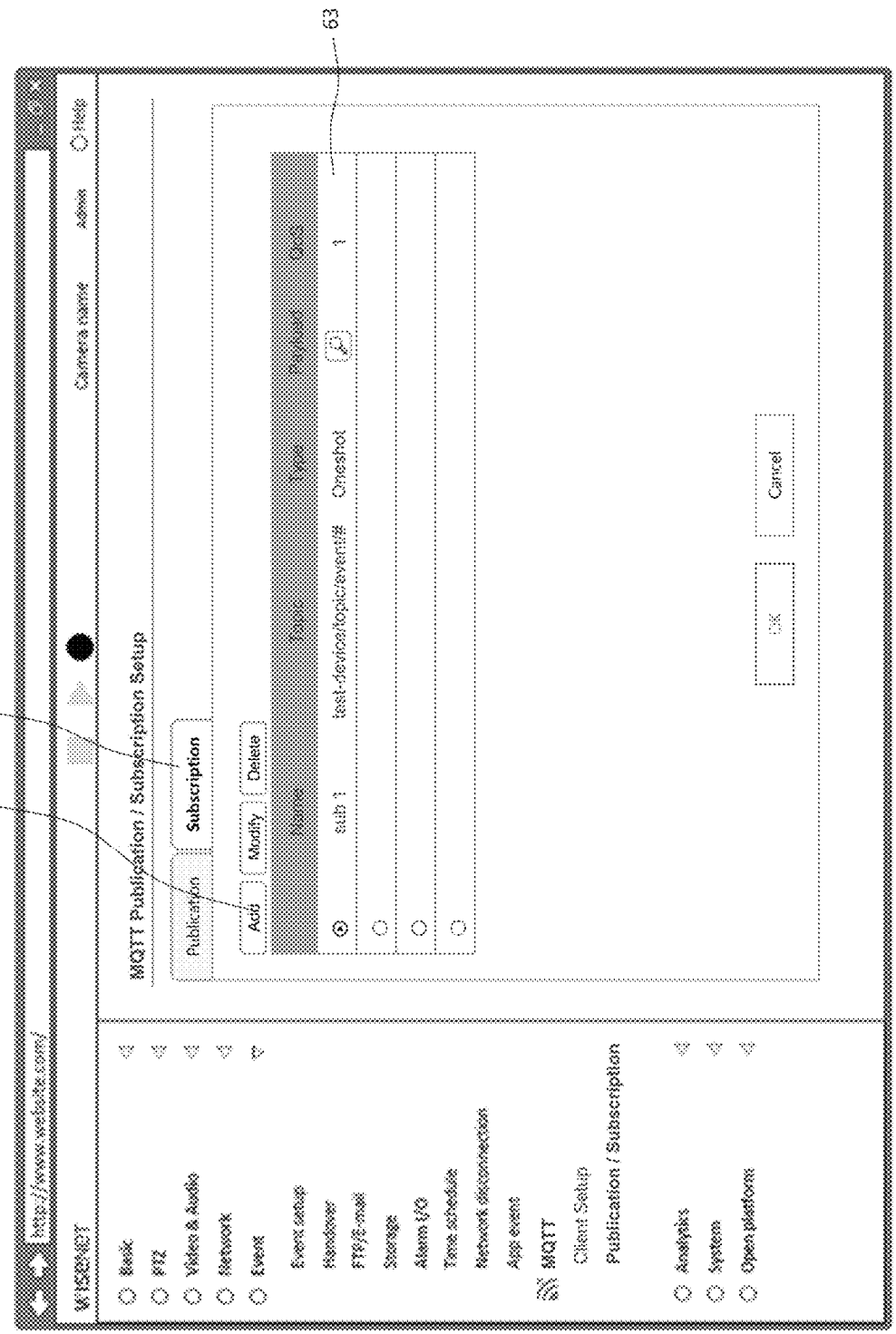
FIG. 16B is an illustration of a GUI used by a subscriber to subscribe to a topic.
Figure 16C:
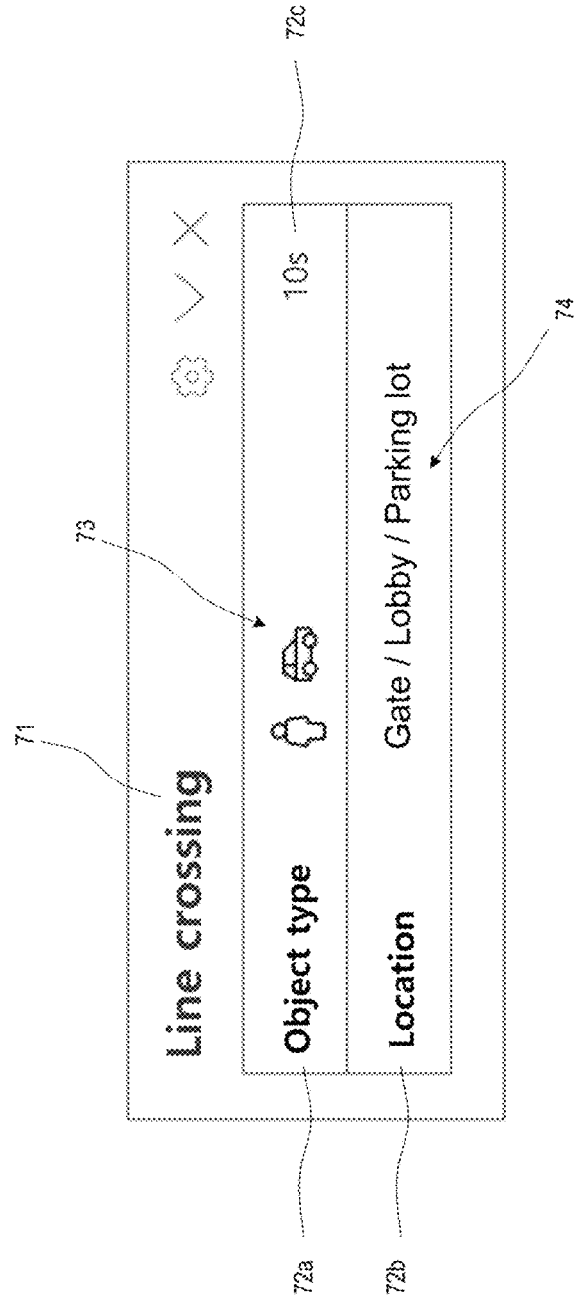
FIG. 16C is an illustration of a GUI used by a subscriber to apply topic filtering.

FIG. 16A is an illustration of a GUI used by a publisher to add a topic, FIG. 16B is an illustration of a GUI used by a subscriber to subscribe to a topic, and FIG. 16C is an illustration of a GUI used by a subscriber to apply topic filtering.

Referring to FIG. 16A, a network camera as a publisher may execute a publication operation using the illustrated GUI. Here, a new topic 53 can be registered in a message broker 300 by pressing an "Add" button 52 in a "Publication" tab 51 on the screen. The topic 53 may include Name, Topic, Payload, QoS, and Retain. Here, Payload is an item that describes status information or event triggers related to a topic, QoS refers to the quality of provided content (e.g., image resolution), and Retain is a 1-bit value indicating whether the topic is to be retained after being registered.

Referring to FIG. 16B, a monitoring device as a subscriber may execute a subscription operation using the illustrated GUI. Here, a desired topic 63 among published topics can be subscribed through the message broker 300 by pressing an "Add" button 62 in a "Subscription" tab 61 on the screen. The topic 63 may include Name, Topic, Type, Payload, and QoS.

In the present disclosure, a publisher 100 is a network camera, and a subscriber 200 is a monitoring device. However, in reality, the GUIs shown in FIGS. 16A and 16B may be screens all usable by a network camera. In this case, one network camera may function as the publisher 100 for a certain topic while functioning as the subscriber 200 for another topic. In this way, if a plurality of network cameras function as both the publisher 100 and the subscriber 200, each network camera can have a function of detecting event occurrence in real time through a huge aggregate of network cameras.

The subscriber 200 may execute subscription by simply selecting some of the published topics. However, as described above in FIG. 13, the subscriber 200 may also execute subscription by filtering detailed conditions for the selected topics.

For example, the subscriber 200 may apply filtering for a line crossing topic 71 as illustrated in FIG. 16C. In the line crossing topic 71, the subscriber 200 may set an object type 72*a*, a location 72*b*, and a duration 72*c* as filtering conditions. In FIG. 16C, person and car 73 are set as the object type 72*a*, gate/lobby/parking lot 74 are set as the location 72*b*, and 10 seconds is set as the duration 72*c*.

These filtering conditions are sent to the message broker 300 and requested. In this case, even if the publisher 100 detects a line cross event and sends an event trigger to the message broker 300, the message broker 300 sends the event trigger to the subscriber 200 only when the above filtering conditions are satisfied.

Many modifications and other examples of the present disclosure will come to the mind of one skilled in the art having the benefit of the teachings presented in the foregoing descriptions and the associated drawings. Therefore, it is understood that the present disclosure is not to be limited to the specific examples disclosed, and that modifications and examples are intended to be included within the scope of the appended claims.

What is claimed is:

1. A network camera comprising a processor and a memory storing instructions executable by the processor, the processor executing the instructions to perform:
   an operation of capturing a video using an imaging device;
   an operation of publishing a topic related to the captured video to a message broker;
   an operation of receiving a search request message regarding the published topic from the message broker;
   an operation of searching the stored video according to the search request message; and
   an operation of generating a response message regarding the search request message based on the search result and sending the response message to the message broker,
   wherein the operation of publishing the topic to the message broker comprises registering an item that describes state information or event triggers related to the topic and an item that indicates the quality of content related to the topic through a graphic user interface (GUI).

2. The network camera of claim 1, wherein the topic related to the captured video comprises metadata about an event of the video.

3. The network camera of claim 1, wherein the search request message comprises at least a type of a target included in the video and further comprises at least one of a location of the target, a range based on the location, a search start time and a search end time, and a search timeout duration.

4. The network camera of claim 3, wherein the processor further performs:
   an operation of searching a video stored in a storage as both the search start time and the search end are earlier than a current time;
   an operation of searching a captured live video as both the search start time and the search end time are later than the current time; and
   an operation of searching both the video stored in the storage and the captured live video as the search start time is earlier than the current time and the search end time is later than the current time.

5. The network camera of claim 3, wherein the type of the target is a license plate, a vehicle, or a human face.

6. The network camera of claim 5, wherein as the type of the target is a human face, the search request message further comprises a match threshold with the human face.

7. The network camera of claim 5, wherein as the type of the target is a vehicle, the search request message further comprises at least one of a vehicle type, a vehicle manufacturer, a vehicle model, and a vehicle color.

8. The network camera of claim 1, wherein the response message comprises at least a search time and further comprises at least one of a result index, a target type, and a search location.

9. The network camera of claim 1, wherein the processor further performs an operation of receiving a handover message from the message broker, and the handover message comprises a type of a target, a location of the target, and a direction of the target.

10. The network camera of claim 1, wherein the processor further performs an operation of receiving a handover message from the message broker, and the handover message comprises camera motion control information, an identifier of the network camera, and a preset token.

11. The network camera of claim 10, wherein the processor further performs an operation of controlling the direction of the imaging device according to the motion control information as the preset token is normal.

12. The network camera of claim 1, wherein the processor further performs an operation of receiving a video captured by another network camera and publishing a topic related to the received video to the message broker.

13. A monitoring device comprising a processor and a memory storing instructions executable by the processor, the processor executing the instructions to perform:
- an operation of receiving a topic related to a captured video from a message broker;
- an operation of subscribing to the received topic;
- an operation of sending a search request message regarding the subscribed topic to the message broker; and
- an operation of receiving a response message regarding the search request message from the message broker,
- wherein the operation of sending the search request message to the message broker comprises selecting at least one of received topics through a GUI and setting detailed filtering conditions for the selected topic, and the operation of receiving the response message from the message broker comprises receiving, from the message broker, the response message comprising only results satisfying the detailed filtering conditions for the topic.

14. The monitoring device of claim 13, wherein the processor further performs an operation of generating an alarm corresponding to the response message.

15. The monitoring device of claim 13, wherein the processor further performs an operation of displaying an information screen corresponding to the response message.

16. The monitoring device of claim 13, wherein the topic related to the captured video comprises metadata about an event of the video.

17. The monitoring device of claim 13, wherein the search request message comprises at least a type of a target included in the video and further comprises at least one of a location of the target, a range based on the location, a search start time and a search end time, and a search timeout duration.

18. The monitoring device of claim 13, wherein the response message comprises at least a search time and further comprises at least one of a result index, a target type, and a search location.

19. The monitoring device of claim 13, wherein the processor further performs:
- an operation of sending a topic filtering request for filtering a sub-condition of the subscribed topic to the message broker; and
- an operation of receiving, from the message broker, only response messages that satisfy the filtered sub-condition for the subscribed topic.

20. The monitoring device of claim 13, wherein the processor further performs an operation of sending a discovery request to the message broker to discover publishers currently connected to the message broker.

* * * * *